Oct. 13, 1936.  D. R. McNEAL  2,057,497

SEPARATING APPARATUS

Filed Feb. 20, 1933  4 Sheets-Sheet 3

INVENTOR
Daniel Raymond McNeal
BY
Symmes &c. Lechner
ATTORNEYS

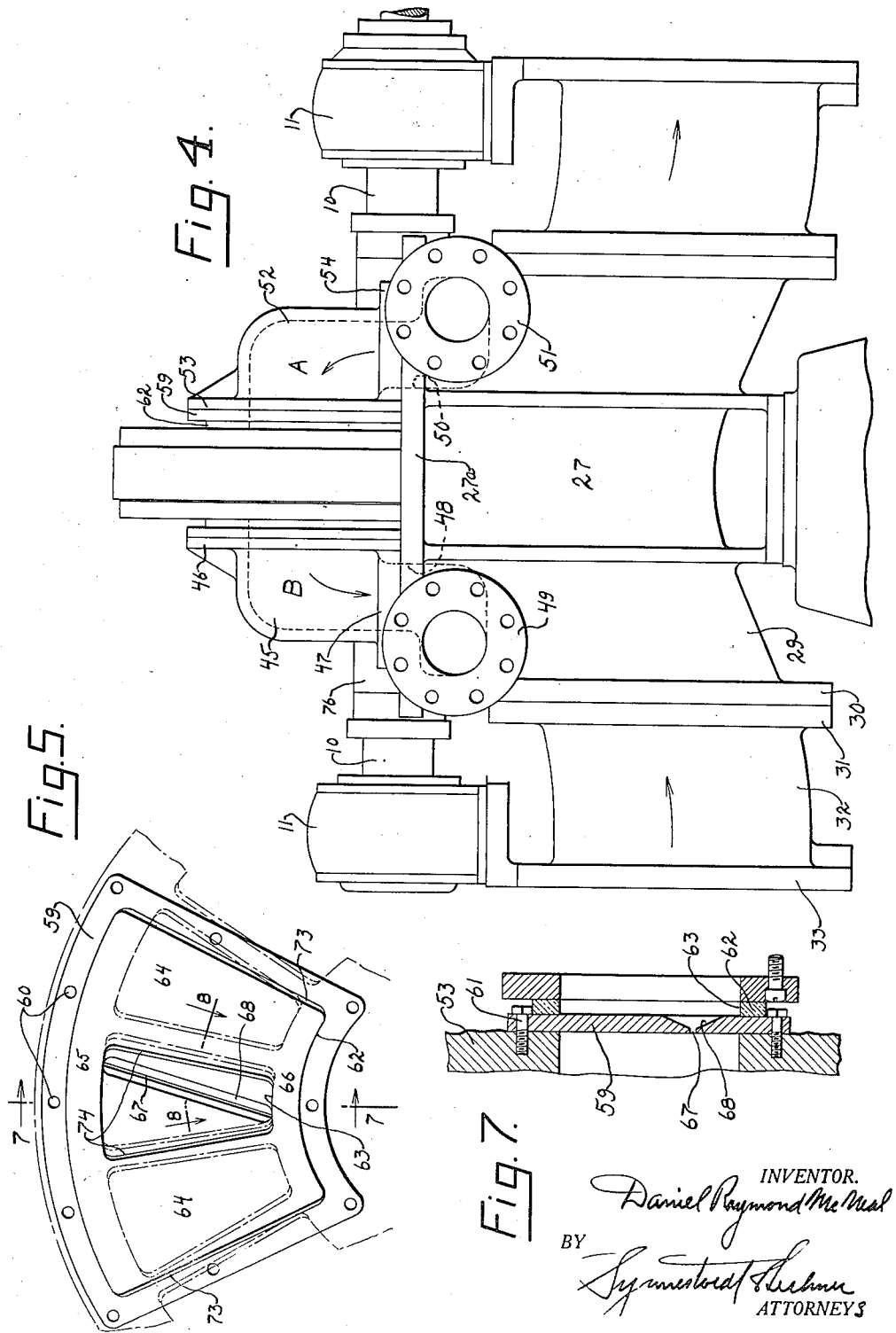

Patented Oct. 13, 1936

2,057,497

UNITED STATES PATENT OFFICE 2,057,497

SEPARATING APPARATUS

Daniel Raymond McNeal, Abington, Pa., assignor to Andale Company, Philadelphia, Pa., a corporation of Pennsylvania Application February 20, 1933, Serial No. 657,586

13 Claims. (Cl. 210—196)

This invention relates to separating apparatus and especially to equipment adapted to separate a fluid or liquid from a material which is entrained or suspended therein or which is carried thereby.

The invention, furthermore, is especially concerned with the separation of materials from fluids or liquids which are under pressure greater than atmospheric. To further clarify the nature of the invention and the field to which it relates, consider, by way of example, a source of a liquid such as water under a pressure of one hundred pounds per square inch. The water has entrained or suspended therein some relatively solid material which it is desired to separate either for the purpose of purifying the water or for the purpose of reclaiming or collecting the material itself. The invention is concerned with the provision of a highly effective apparatus or equipment for accomplishing the separation and particularly for removing the relatively solid material from the high pressure liquid without incurring appreciable pressure loss, and delivering the said material to a zone or region or vessel of low pressure, usually atmospheric. As will appear more fully after consideration of the structural embodiment of the equipment illustrated in the drawings of this application, the invention is also applicable where the pressure conditions are reversed as compared with those referred to above, i. e., where the fluid or liquid containing the material to be separated is under negative pressure (i. e., below atmospheric) and where the region to which the material separated is to be delivered is under relatively high pressure.

By way of example, it might be mentioned that equipment or apparatus embodying features of the present invention may be employed for the purpose of reclaiming valuable materials from a liquid which has been used in a machining operation or the like. The equipment might also be employed for removing pieces or particles of ore from a liquid employed in a mining operation. Additionally, the apparatus is adapted to be employed as a strainer or filter as, for example, where it is desired to purify a water supply or source. It is here noted that while apparatus embodying the important features of this invention may be employed for a wide variety of uses, the principles of the invention are herein illustrated and described as applied to what has become known in the art as a "rotary strainer".

With regard to the major objects and advantages of the invention, one of the most important and outstanding improvements is the provision of an equipment or apparatus of the character above referred to so constructed that the pressure of the liquids and/or materials being handled is subject to a reduction or a loss which is negligible for all practical purposes and further constructed so that leakage of the liquids or materials under pressure is substantially eliminated.

Another important advantage flows from the arrangement of the apparatus so as to permit accurate control of the rate of separation. Other objects and advantages of a more or less detailed nature will appear more fully hereinafter as this description proceeds.

As noted above, for the sake of illustration in the present application, I have shown in the drawings a rotary strainer structure incorporating features of this invention, the drawings including the following views:—

Brief description of figures

Figure 4 is a side view taken from the right of Figure 2;

Figures 5 and 6 are face views of certain sealing devices which I employ in association with the cleaning cavities or boxes in the strainer casing, Figure 5 also illustrating portions of the strainer rotor in contact with the sealing devices;

Figure 7 is a sectional view of the sealing device shown in Figure 5, the view being taken substantially as indicated by the section line 7—7 on Figure 5;

Description of specific embodiment

Figure 1:
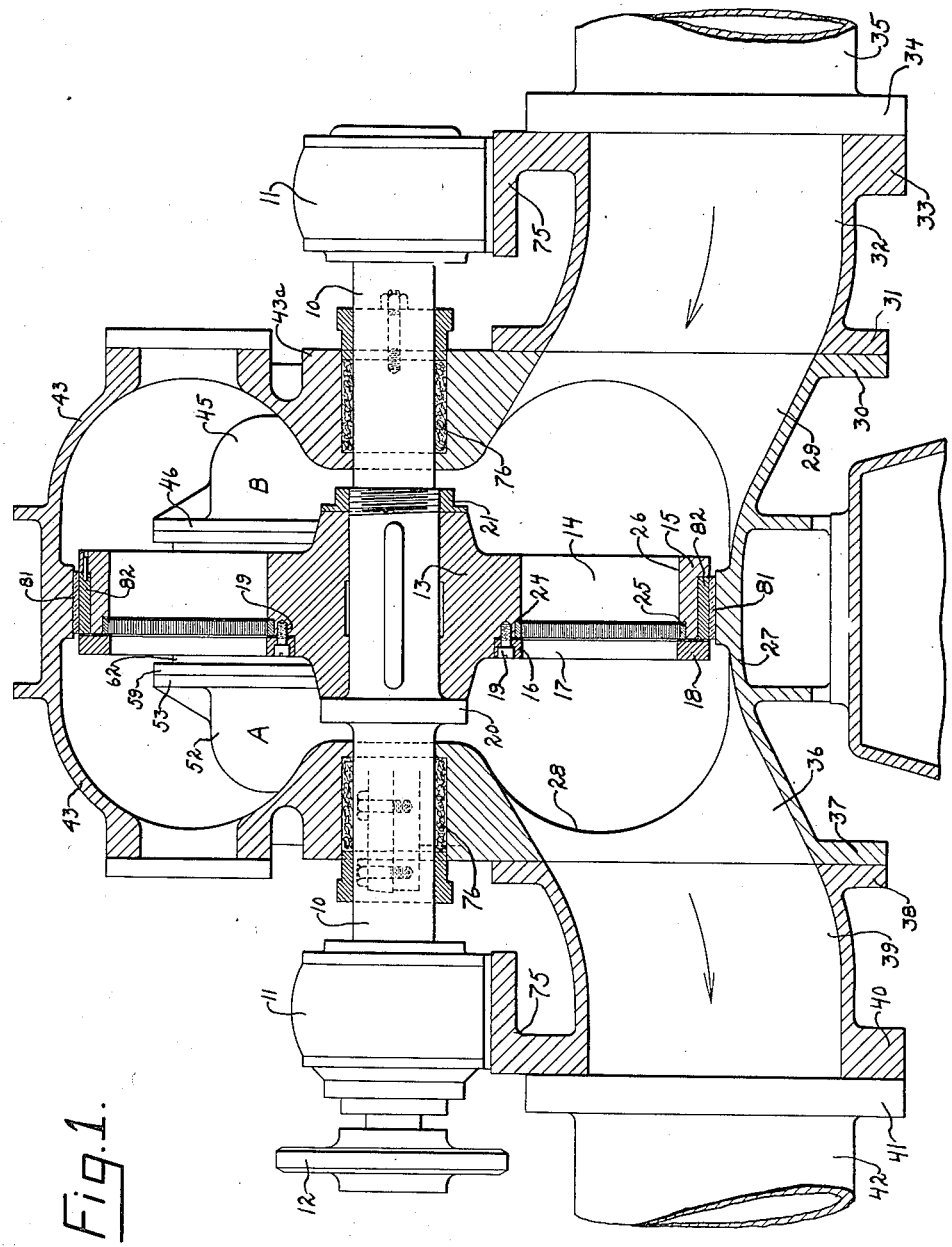
Figure 1 is a vertical sectional view through a strainer rotor and casing constructed in accordance with the present invention, the view being taken substantially as indicated by the section line 1—1 appearing on Figure 2.

Rotary strainers of the general type illustrated in the drawings and described hereinafter usually are arranged for continuous operation. That is, provision is made for cleaning the straining elements without stopping the straining operation.

Figure 2:
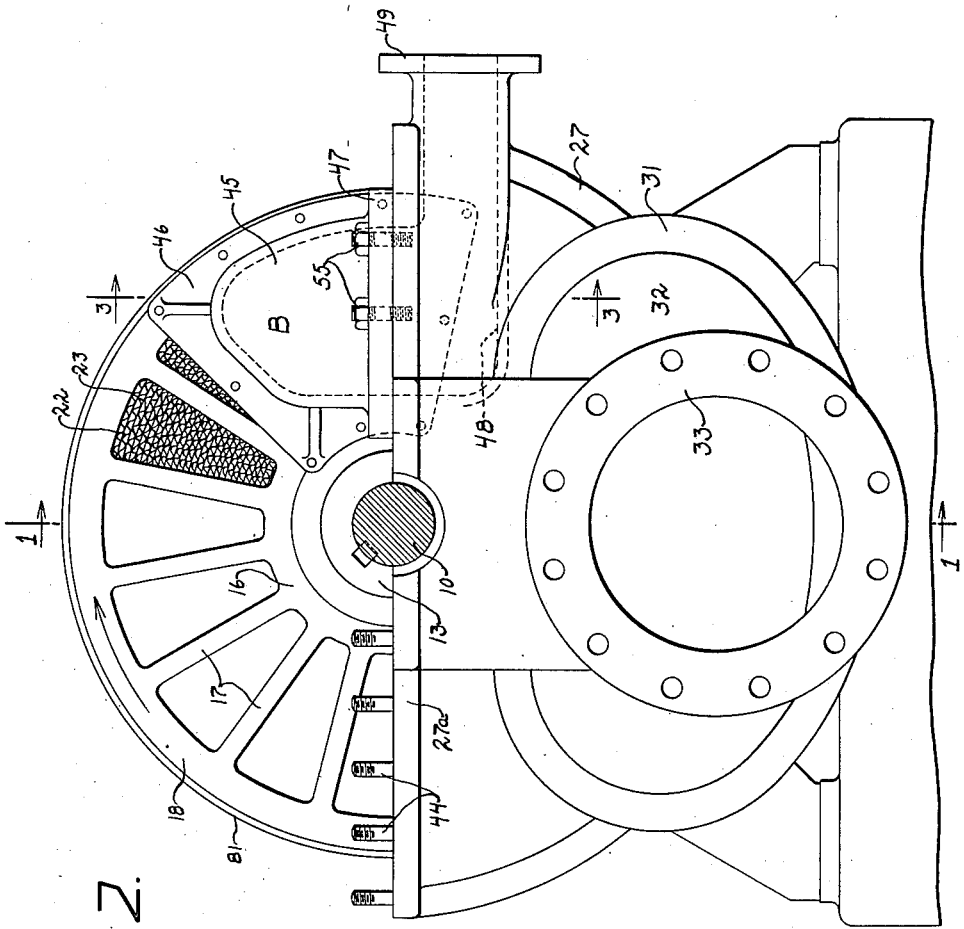
Figure 2 is a side elevational view taken from the right of Figure 1 but with the upper portion of the casing removed.

In considering the drawings, specific reference is first made to Figures 1, 2, and 4 in which is shown a strainer casing with a rotor mounted therein for rotation with a shaft 10 journaled in bearings 11—11 and which carries a driving element such as the gear 12. The rotor preferably includes a pair of relatively separable members or wheels each having a hub, spokes and a peripheral ring. The base or primary part of the rotor includes the hub 13, spokes 14 and peripheral ring 15, and the other rotor part has a hub 16, spokes 17 and a ring 18, the two parts being adapted to be bolted to each other substantially in the manner illustrated in Figure 1 as by the studs 19. The hub part 13 has a central aperture adapted to receive the driving and supporting shaft 10 and is further arranged to be keyed to the drive shaft. An annular flange or abutment 20 serves to position the rotor on the shaft and a threaded collar 21 may be employed to rigidly secure the rotor in position as clearly shown in Figure 1.

The straining element or elements which I prefer to employ include alternate spirally wound corrugated and flat strips 22 and 23 respectively. These may be wound on a suitable form or bobbin and thereafter positioned as an annular strainer unit between the two parts of the strainer in the manner shown in Figure 1. By reference to this figure it will be seen that the rotor hub member 13 is recessed as at 24 at one side thereof in order to receive the inner edge of the annular straining unit. A similar recess 25 is provided in the peripheral ring 15 to accommodate the outer annular edge of the strainer.

It will be understood, of course, that the spokes 14 are of such width transverse the plane of rotation of the rotor as to provide an annular cavity in the rotor for the straining unit. The separable rotor part (including hub 16, spokes 17 and ring 18) serves to retain the strainer in its proper position.

From the foregoing it will be seen that the rotor structure provides a plurality of sector shaped strainer compartments 26 throughout the entire area of each of which effective straining elements are provided.

Figure 3:
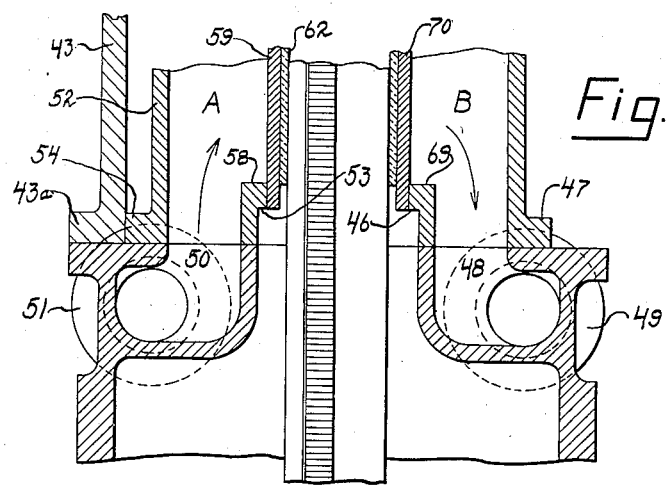
Figure 3 is a fragmentary sectional view taken as indicated by the section line 3—3 on Figure 2.

The strainer rotor is mounted to revolve with its shaft 10 in a casing structure which, as appears in Figures 1, 2, and 3, is composed generally of two parts. One part constitutes a base and is indicated in the drawings by the numeral 27. This part forms substantially the entire lower half of the casing and from Figure 1 it will be seen that the casing part 27 may conveniently have wall elements 28 cast integrally therewith which define a generally annular or doughnut-shaped straining cavity or chamber. The strainer rotor is so mounted that the compartments 26 between the spokes thereof move in an annular path in this doughnut-shaped straining cavity.

The fluid or liquid to be strained is introduced into the straining cavity at one side of the casing through the inlet passage 29, around the outer edge of which a flange 30 is positioned to cooperate with a complementary flange 31 formed on the inlet connection member 32. The connection member 32 also has a flange 33 of circular shape adapted to cooperate with flange 34 of the inlet pipe 35. A complementary discharge passage 36 is arranged at the opposite side of the casing element 27 and is provided with a flange 37 adapted to cooperate with flange 38 of the discharge connection member 39, the latter, in turn, having a flange 40 for the purpose of facilitating attachment of flange 41 of the discharge pipe 42. As seen in Figure 2 (illustrating the inlet side of the apparatus in elevation) the inlet connection member 32 is flared from the circular flange 33 inwardly to the attachment flange 31 which cooperates with the casing flange 30. Note that flanges 30 and 31 approximately surround the lower half of the entire casing structure. In consequence, the connection member 32 is very materially flared between its attachment flange 33 for the pipe 35 and its flange 31 by means of which it is secured to the casing. The configuration, flaring, extension and the like of the parts at the discharge side of the casing are similar to those just described in connection with the inlet side of the apparatus.

In accordance with the present invention, the upper half of the casing is also preferably formed in one part 43, and at this point it is noted that in Figures 2 and 4 the upper casing part is shown removed from the lower part in order to disclose some of the interior strainer elements. The two casing halves are provided with flanges 27a and 43a adapted to abut when the halves are brought together. The two parts may be rigidly secured to each other as by means of studs 44 (see Figure 2).

In the preferred form of the apparatus, the annular strainer cavity (a portion of which is formed by walls 28 in the lower casing part) is continued substantially throughout the semi-annular extension of the upper casing half 43, the wall elements of this upper casing part being suitably curved and rounded to serve this purpose in the manner clearly indicated in Figure 1.

From Figures 1 to 4 inclusive it will be seen that I have arranged clean-out boxes or chambers A and B, the first of these serving to introduce the cleaning fluid to pass through the strainer elements 22—23 in a direction reversed with respect to the direction of flow of the fluid entering through the pipe 35, connection member 32 and the inlet 29. The other clean-out box serves to carry away the cleaning liquid together with any materials which are being strained or removed.

To consider the construction of these boxes, reference is first made to the box B which appears to best advantage in Figure 2. The box B includes a hollow bulbular portion 45 (see also Figures 1 and 4) having a flange 46 presented toward the strainer rotor and also an additional flange 47 which is adapted to seat on an inner portion of flange 27a formed at the top of the lower casing part 27.

As seen in Figure 2 the flange 46 is generally sector shaped, a portion thereof being extended downwardly into the interior of the lower half of the casing. As appears most clearly in Figures 2, 3, and 4, the lower flange 47 of the box B is apertured to provide communication with a cavity 48 formed in the lower casing part, this cavity being extended away from the axis of the rotor to terminate in a connection flange 49 to which a pipe may be attached for conducting the straining medium and the strained materials away from the strainer.

Entirely similar arrangements are provided in connection with the inlet cleaning box A, although as will readily be understood from inspection of the drawings, the members at the inlet side are complementarily disposed and constructed. The corresponding cavity in the lower casing part at the inlet side of the cleaning equipment is indicated in Figures 3 and 4 at 50, and the connecton member to which a supply pipe may be connected is shown at 51. Still further, the main body part of the box A is designated by the numeral 52, while the inner flange appears at 53. The attachment flange of box A is shown at 54 and it might here be noted that flanges 47 and 54 of boxes B and A, respectively, may be secured to the lower casing part 27 as by means of studs 55 (see Figure 2), these being located inwardly of the studs 44 by means of which the two casing parts are secured to each other (see Figure 3).

Still referring to Figure 3, it will be seen that flange 53 at the inner face of the box A is centrally apertured as indicated at 58 and, in accordance with the embodiment of the present invention illustrated in the drawings, the opening 58 is spanned by a plate member 59 the configuration and structure of which appears in greater detail in Figures 5 and 7. From these latter views it will be apparent that plate 59 is generally of sector shape (corresponding to the size and shape of flange 53) and is provided with a series of apertures 60 around its edges adapted to receive studs 61 (see Figure 7) for securing the plate to the flange 53.

From the foregoing it will be apparent that although the clean-out boxes A and B are located, in the particular embodiment illustrated, at least in large part within the upper casing member 43, the connections to and from these boxes are made through passages which extend into the lower casing part 27. By virtue of this arrangement, the upper casing member may readily be completely separated in order to expose inner strainer parts without the necessity of disconnecting any threaded (or otherwise jointed) pipe connections. It will further be seen that each of the clean-out boxes constitutes a unit which may readily be removed and replaced, as when making inspections, repairs or replacements.

One of the most important features of this invention is involved in the means by which the cleaning boxes are sealed against opposite faces of the strainer rotor. In accordance with the arrangement shown, the plate 59 (see Figures 3, 5, and 7 particularly) is utilized to carry a rubber or other resilient sealing member or device 62 which, for reasons which will appear more fully hereinafter, has a sector shaped opening 63 of substantially the same arcuate dimension as the distance between adjacent spokes 14 or 17 of the strainer wheel. The rubber sealing device 62 also has relatively extended areas 64—64 at opposite sides of the aperture 63 the purpose of which will be brought out more fully hereinafter. In addition, this sealing device has flat areas 65 and 66 disposed radially outwardly and radially inwardly of the aperture 63 in position to contact with a peripheral ring of the strainer wheel as well as with a hub part thereof. The contact or juxtaposition of the rotor spokes 17, the peripheral ring 18 and the hub 16 with the rubber or other resilient sealing device 62 will be apparent from the dot and dash line showing of these parts in Figure 5.

Figure 8:
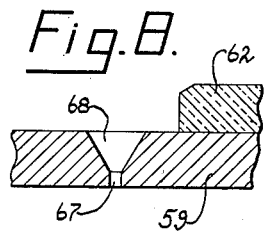
Figure 8 is a sectional view showing certain details, this view being taken on the line 8—8 of Figure 5.

In order to permit the cleaning medium to flow from the box A through the aperture 63 in the sealing device 62, the plate member 59 is also apertured, although as will be apparent from inspection of Figures 5, 7, and 8, the aperture in the plate takes the form of an elongated slot 67 preferably formed at an angle to any adjacent radius line from the center of the rotor. This slot may also have a flared discharge opening 68 as most clearly seen in Figure 8.

Figure 6:
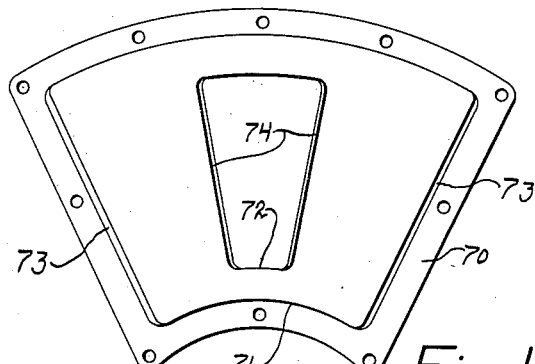

Turning again to Figure 3, it will be seen that the arrangements at the discharge side of the clean-out mechanism are quite similar to those already described. Flange 46 of the box B is centrally apertured as at 69 and the flange carries a plate 70, the details of which appear to better advantage in Figure 6. This plate also is of substantially the same outside configuration and dimensions as plate 59, and plate 70 is furthermore adapted to be secured to flange 46 by bolts in the same manner as plate 59 is secured to the flange 53. The rubber sealing device associated with plate 70 is indicated in Figure 6 by the numeral 71 and this sealing device is preferably of construction identical to that already described, in accordance with which it has a central sector shaped opening 72 therein. In this instance, however, instead of employing a narrow and elongated slot in the supporting plate 70, I provide a central aperture in plate 70 of substantially the same dimensions and configuration as the opening 72 which, as before indicated, corresponds to the dimensions of the sector shaped pockets 26 formed between adjacent spokes of the strainer wheel. Similarly extended sealing areas are also provided on all sides of the aperture 72 for reasons which will appear more fully hereinafter.

With regard to both of the resilient sealing elements, it might be noted that they may conveniently be secured to their respective plate members as by vulcanizing. Both of the sealing devices, furthermore, are provided with slightly beveled corners at their radial edges as indicated at 73. Similar beveled corners 74 are provided at the radial edges of the apertures 63 and 72.

Turning again to the showing of Figure 1, attention is called to the fact that the bearings 11—11 for the shaft 10 are supported on blocks 75—75 which in turn are carried by the inlet and outlet connection members 32 and 39, so that proper positioning of the bearings is always assured. The casing parts 27 and 43, of course, are apertured toward the center of the entire casing in order to pass the shaft 10 and packing devices 76—76 may be employed to prevent leakage around the shaft 10.

Figure 9A:
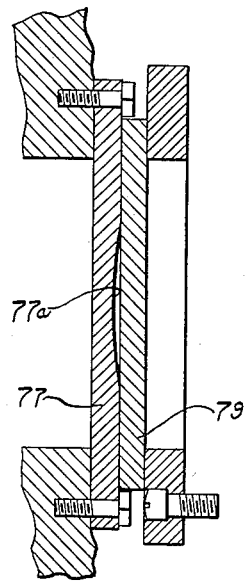
Figure 9a is a sectional view taken as indicated by the corresponding section line on Figure 9.
Figure 9:
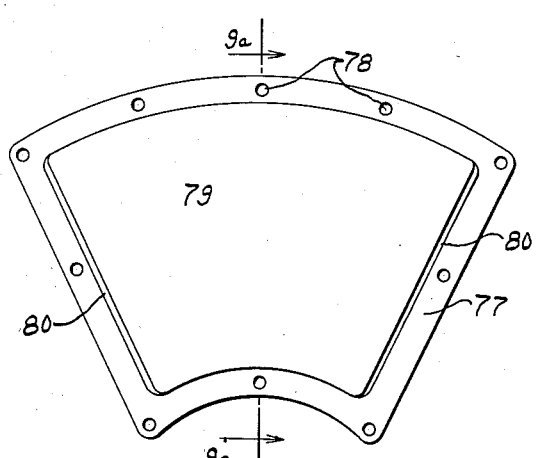
Figure 9 is a view similar to Figure 5 but showing a modification of a sealing device which I may also employ.

In Figures 9 and 9a I have illustrated a modified form of sealing device which I may employ in place of the arrangement of Figures 5 and 7. In this instance, a plate 77 which is imperforate with the exception of the bolt holes 78, is substituted for plate 59 having the elongated slot 67 therein. Figures 9 and 9a also show a rubber sealing device 79 which is entirely imperforate, the radial edges being beveled as suggested at 80. The structure of this modified form also includes a slight depression or concavity 77a in the face of plate 77 presented toward the strainer wheel, this being provided in order to permit the rubber member 79 to flex outwardly slightly in a central region thereof for reasons to be discussed hereinafter. Also, as will appear more fully in some comments hereinafter, when the arrangement of Figures 9 and 9a is employed, the inlet cleaning cavity or box is completely blanked off, and no supplementary cleaning medium is supplied to the strainer wheel.

At this time attention is also called to the provision of an annular resilient, preferably rubber, ring 81 around the periphery of the strainer wheel. This may conveniently be vulcanized on to a metallic ring 82 which is carried by the rotor in the manner clearly shown in Figure 1. The resilient ring 81 is in the nature of a sealing element which abuts against a complementary cylindrical surface formed internally of the casing parts 27 and 43.

Description of operation

For purposes of illustration assume that the equipment is to be employed in connection with a source of water under relatively high pressure (for example, under one hundred pounds pressure per square inch) and that the water contains materials suspended therein or carried thereby in the nature of impurities such as leaves, sand, pebbles or the like. The present equipment, as hereinbefore mentioned, is designed to separate, strain or filter the relatively solid materials from the water or other liquid without incurring any appreciable pressure loss, the relatively solid materials being discharged after separation into a relatively low pressure region or point of disposal.

To accomplish this purpose the water, with the entrained relatively solid materials, is introduced as by means of the conduit 35 through the connection member 32 and the passage 29 in the direction shown by the arrows in Figure 1. The incoming water and entrained materials spread out annularly in the passage 29 and in the doughnut-shaped straining cavity at the inlet side of the equipment and are therefore spread over a relatively extended circumferential area of the strainer wheel. As the water passes through the strainer elements 22—23, the relatively solid materials collect in the sector shaped pockets 26 between these spokes and are carried by the strainer wheel or rotor upwardly to the clean-out devices or boxes. I prefer to provide for rotation of the rotor in the direction indicated by the arrow in Figure 2, in accordance with which the strainer pockets move upwardly at the left of this view and downwardly at the right.

The water, after having passed through the strainer 22—23 is again collected in the discharge passage 36 and the connection member 39 to be conducted away through the pipe 42.

When the arrangement of Figures 1 to 8 inclusive is employed, a cleaning medium which, in the present illustration would preferably be a liquid, is introduced through the connection 51 and therefore conducted upwardly into the box A from which it passes through slot 67 in plate 59 and through aperture 63 in the sealing device 62 and finally through the strainer elements as they move across the face of the sealing device 62. This, of course, washes the strained materials from the pockets 26 between adjacent rotor spokes and the materials are carried away from the box B through the connection 49. The direction of flow of the cleaning medium is clearly shown by the arrows in Figures 3 and 4.

Operational and structural features and advantages

While rotary strainers having a constantly moving strainer wheel mounted in a casing with straining cavities at one side and cleaning cavities at another side thereof are well known to the art, it is now noted that equipment of this nature heretofore employed has been subject to numerous rather serious disadvantages and difficulties. In the first place, the pressure at which prior equipments could satisfactorily be operated was materially limited in view of the fact that a large amount of leakage and excessive loss of pressure were incurred. In certain attempts to utilize equipment of this general nature at relatively high pressures provision was made for opening the discharge cleaning cavity or box only periodically, the said discharge box normally remaining closed. Devices of this nature, ordinarily referred to as "back pressure valves", were designed either for automatic or for manual operation and have always been a constant source of trouble in view of their unreliability and other disadvantages which are incident thereto such, for example, as clogging by the refuse or other materials being separated. Still another material disadvantage of such prior arrangements resides in the fact that where the cleaning operation is effected only periodically the efficiency and capacity of the equipment is impaired.

In accordance with the present invention, when features thereof are incorporated in a rotary strainer or filter as illustrated in the drawings, it is unnecessary to utilize back pressure valves since leakage and pressure loss are substantially eliminated by the arrangement of certain portions of the apparatus itself.

I have found that by employing rubber or other resilient material sealing devices at the inlet and outlet sides of the so-called cleaning boxes and by positioning the several parts of the rotor, the casing and the sealing devices in such manner that the spokes of the rotor contact with the sealing devices (or in such manner that the sealing devices are placed under slight compression between their associated backing plates and the rotor spokes), leakage and pressure loss from the relatively high pressure liquid being strained to the relatively low pressure cleaning boxes, especially on the discharge side, are substantially completely eliminated. The water or other liquid which is being strained, furthermore, apparently acts not only as a lubricant for the spokes as they move across the surfaces of the rubber sealing devices, but further serves to complete a highly effective pressure seal, especially where the rubber sealing devices are placed under some slight compression between their backing plates and the spokes of the strainer wheel. In some instances where it seems desirable to actually place the rubber sealing devices under compression, although the actual compression may be almost immeasurable, it may at the same time be sufficient to cause a certain "flowing" action of the rubber as the spokes of the strainer wheel pass across the contacting surfaces of the sealing devices.

Further with regard to the sealing devices, it should be observed that the blank or imperforate areas thereof at opposite sides of the apertures therein should be of such circumferential extension that at least one spoke of the rotor is always in contact with each imperforate area at each side of the cleaning medium apertures.

Stated in another way, the relative arrangement of the rotor spokes and the rubber sealing device at either side of the equipment should be such that just before one spoke leaves or moves away from the sealing device the third succeeding spoke shall have commenced its movement across the face of the sealing device at the advance edge thereof. This relative arrangement is clearly illustrated in Figure 5, from which it will further be seen that the apertures in the sealing devices are of substantially the same shape and dimensions as the individual strainer compartments 26 formed between adjacent rotor spokes.

In addition to the foregoing and contrary to what might ordinarily be expected, I have found that resilient sealing devices of the nature above described are subjected to very little if any wear even when used for long periods of time at relatively heavy pressure and even where the resilient material is placed under compression between the rotor spokes and the backing plates. In order to obtain the greatly extended life referred to, however, it is of importance to maintain the contacting surfaces of the strainer wheel and the sealing elements well lubricated, but when the strainer is being employed in connection with a liquid, such as water, I have found that the liquid itself is amply sufficient to provide the necessary degree of lubrication.

As a consequence of this tremendously improved sealing effect which I have obtained, the equipment may be employed at much higher pressures than has ever been possible heretofore and this, as before stated, without the necessity of employing back pressure valves. Still further the arrangement is such that much finer strainer or filter elements may be used, this being of great importance since it makes possible the use of a rotary strainer or other similar equipment for many purposes to which they were not adapted heretofore.

Thus it will be seen that, in its broad aspect, the invention contemplates a piece of equipment adapted to separate a relatively fluid or a liquid material from relatively solid materials entrained or suspended therein or carried thereby, the equipment being such that this separation may be effected continuously even where the liquid or fluid is under heavy pressure and where the material or materials separated out are discharged into a region of atmospheric or even sub-atmospheric pressure.

There are, of course, a number of features of the invention which are particularly adapted to and which are of especial advantage in the specific embodiment herein illustrated and described, i. e., a rotary strainer, although it should be understood that many principles and features of the invention are equally applicable to equipment of other types such, for example, as ore concentrators or devices adapted to reclaim some valuable materials from a fluid or liquid which must be maintained under high pressure.

Turning now to the modification of Figures 9 and 9a in which is illustrated an entirely imperforate resilient sealing device, where an arrangement of this type is employed (wherein the backing plate is provided with a slight concavity and wherein the rubber sealing device has extended areas on all sides of the concavity) the operation involved in cleaning the strainer elements is somewhat different. Bearing in mind that the liquid or fluid from which it is desired to remove certain more or less solid materials is under relatively heavy pressure, when the individual compartments 26 between adjacent rotor spokes move upwardly between the two sealing devices these compartments are substantially completely sealed or closed with the fluid under pressure therein. As soon as any particular compartment 26 comes into registry with the aperture in the outlet sealing device (the outlet sealing cavity being subjected only to relatively low pressure) the fluid or liquid will flow out through the outlet aperture and will carry the strained materials therewith. I have found that for many purposes a highly effective cleaning action may be carried out in this way, i. e., without the introduction of any supplemental or auxiliary supply of cleaning medium and, in the operation of the structure, in accordance with this modification, the pressure of the fluid which is sealed in each individual compartment 26 causes a slight distortion in the face of the rubber sealing device at the inlet side. As soon as the sealed compartment is opened at the outlet side through the aperture in the outlet sealing device the resiliency of the sealing device at the inlet side causes its surface to return again to its normal plane and this action, although the actual deflection of the rubber may be almost immeasurable, is sufficient to create a considerable rush or spurt of fluid through the straining elements. It might also be observed that even where a supplemental supply of cleaning medium is employed (in which case the inlet sealing device will be apertured) a similar rapid flushing or washing action takes place, especially when any particular strainer compartment 26 first comes into registry with the aperture in the outlet sealing device, although the effect of the action may be less under these circumstances.

It should also be noted that the use of a resilient or rubber ring at the periphery of the strainer wheel produces a greatly improved sealing action between the opposite sides of the strainer casing. This ring should also be well lubricated during operation although, here again, in instances where the equipment is being used in connection with the straining of a liquid, the liquid itself provides the necessary degree of lubrication. With proper lubrication this peripheral ring also has very great life and shows practically no wear at all even after long periods of use.

There are, of course, other structural advantages and features of importance in the particular embodiment of equipment herein illustrated and described. For example, the casing parts 27 and 43 are so arranged that upon relative separation of the upper casing parts the entire rotor may be removed as a unit, this being accomplished without disconnecting any threaded pipe connections such as the inlet and outlet connections for the fluid being strained or the inlet and outlet connections for the cleaning medium, since all these connections are made to the lower or base part of the casing. Upon removal of the upper casing part the clean-out boxes A and B, of course, may also be removed for purposes of inspection or replacement of the rubber sealing devices and this operation does not necessitate uncoupling of any threaded pipe connections.

There are also advantages involved in the disposition of the cleaning cavities or boxes in a somewhat offset position as shown in Figure 2. In the first place, the passages for the cleaning medium may be very short even though the connections for this medium are made to the lower casing part. Furthermore, when the rotor moves in the direction indicated by the arrow in Figure 2 the path of movement of any particular strainer compartment 26 between the cleaning boxes and the direct line of flow between the inlet and outlet connections for the fluid being strained is relatively short, and in consequence a better straining action is provided. It will also be apparent that more than one pair of cleaning boxes may be employed. For example, a pair may be arranged substantially in the position shown in Figure 2 and another pair may be located approximately diametrically opposite, and for certain types of operations the multiplication of the cleaning boxes and the associated sealing devices and the like would greatly increase the capacity of a single piece of equipment.

It is to be understood that the term "rubber" (appearing in the appended claims in defining the sealing devices) is employed to refer to any resilient material or compound having characteristics sufficiently similar to those of rubber to perform the function intended.

I claim:—

1. Apparatus of the character described including a casing having a cavity therein, a strainer wheel having an annular series of strainer compartments, the wheel being mounted to rotate in the casing, connection means for a material to be strained associated with the casing, the connection means being disposed toward opposite sides of said cavity to provide for the flow of the material to be strained into the casing at one side and out of the casing at the other side thereof, and means for cleaning the strainer compartments including a pair of rubber sealing devices disposed at opposite sides of the path of movement of the strainer wheel in substantially the same circumferential position, said sealing devices having arcuate dimensions equal to only a fraction of the circular dimension of said series of strainer compartments but having an arcuate dimension at least as great as that of any three contiguous strainer compartments, and at least one of said sealing devices being apertured in a central area thereof to provide for the discharge therethrough of substances being removed from the material introduced through said connection means, together with a conduit through which the strained substances are discharged after passage thereof through said aperture.

2. Apparatus of the character described including a casing having a cavity therein, a strainer wheel having an annular series of strainer compartments, the wheel being mounted to rotate in the casing in such manner that the strainer compartments travel in said cavity, the casing being split into a plurality of relatively separable parts, connection means for a material to be strained associated with one of the casing parts, the connection means being disposed toward opposite sides of said cavity to provide for the flow of the material to be strained into the casing at one side and out of the casing at the other side thereof, and means for cleaning the strainer compartments including a pair of rubber sealing devices disposed at opposite sides of the path of movement of the strainer wheel in substantially the same circumferential position, said sealing devices having arcuate dimensions equal to only a fraction of the circular dimension of said series of strainer compartments but having an arcuate dimension at least as great as that of any three contiguous strainer compartments, and at least one of said sealing devices being apertured in a central area thereof to provide for the discharge therethrough of substances being removed from the material introduced through said connection means, together with a conduit through which the strained substances are discharged after passage thereof through said aperture, the said conduit being associated with the said one casing part, whereby the several casing parts may be relatively separated without necessitating uncoupling of any associated pipe connections.

3. A rotary strainer including a strainer rotor, a casing surrounding the rotor and having inlet and outlet cavities therein at opposite sides of the rotor for the material to be strained, the casing further having other inlet and outlet cavities therein at opposite sides of the rotor to provide for the passage of a cleaning material through the rotor, said casing being split substantially diametrically of the rotor into two sections one of which has connection means associated therewith for the material to be strained as well as for the cleaning material for the rotor, and the other of which is relatively separable, whereby to provide for removal of the rotor without disconnecting the connection means for the material to be strained or for the cleaning material.

4. A rotary strainer including a strainer rotor, a casing surrounding the rotor and having inlet and outlet cavities therein at opposite sides of the rotor for the material to be strained, the casing further having other inlet and outlet cavities therein at opposite sides of the rotor to provide for the passage of a cleaning material through the rotor, said casing being split substantially diametrically of the rotor into two sections in one of which the cavities first mentioned are at least in large part housed and in the other of which the cavities second mentioned are at least in large part housed, one of said sections having connection means associated therewith for the material to be strained as well as for the cleaning material for the rotor, and the other section being relatively separable, whereby to provide for removal of the rotor without disconnecting the connection means for the material to be strained or for the cleaning material.

5. A rotary strainer including a strainer rotor having a plurality of spokes with straining elements therebetween, inlet and outlet conduit means extended to and from opposite sides of the path of movement of the rotor to provide for the flow of a liquid to be strained therethrough, and inlet and outlet conduit means extended to and from opposite sides of the rotor to provide for the passage of a cleaning medium therethrough, at least one of the conduit means last mentioned being provided with a rubber sealing device which is apertured to permit passage of the cleaning medium therethrough, the maximum circumferential extension of said aperture in the rubber sealing device being within or not greater than the maximum circumferential dimension or distance between adjacent spokes of the rotor, and said sealing device being maintained under compression between the associated conduit means and the rotor spokes and further being of sufficient extension or dimension circumferentially of the rotor to ensure contact therewith of at least three rotor spokes at all times during operation.

6. A rotary strainer including a strainer rotor having a plurality of spokes with straining elements therebetween, inlet and outlet conduit means extended to and from opposite sides of the path of movement of the rotor to provide for the flow of a liquid to be strained therethrough, and inlet and outlet conduit means extended to and from opposite sides of the rotor to provide for the passage of a cleaning medium therethrough, at least one of the conduit means last mentioned being provided with a rubber sealing device which is apertured to permit passage of the cleaning medium therethrough, the maximum circumferential extension of said aperture in the rubber sealing device being within or not greater than the maximum circumferential dimension or distance between adjacent spokes of the rotor, and said sealing device being maintained under compression between the associated conduit means and the rotor spokes and further having a circumferentially extended area at each side of the aperture therein, the extension of said areas being sufficient to ensure contact therewith of at least one rotor spoke at all times during operation, and the total circumferential dimension of said sealing device being sufficient to ensure contact therewith of at least three rotor spokes at all times during operation.

7. In combination with a strainer rotor having a plurality of spokes defining strainer pockets, conduit means for passing a liquid through the rotor to be strained thereby, conduit means for delivering a cleaning medium to and through the strainer pockets, the conduit means last mentioned having an opening directed toward the path of movement of the strainer pockets during operation of the rotor, and an apertured rubber sealing device in registry with said opening and abutting against the spokes of the rotor, the maximum circumferential extension of the aperture in the sealing device being within or not greater than the maximum circumferential dimension between spokes, and the number of spokes and the circumferential extension of said rubber sealing device being so relatively arranged and proportioned that at least three spokes are in contact with the sealing device at all times during rotation of the rotor.

8. Straining equipment including a casing, a strainer disc mounted so as to divide the casing into inlet and outlet chambers, the disc being annularly divided into a plurality of strainer sections, straining means in each section spaced from the inlet side of the disc to provide a pocket, opposed clean-out means at each side of the disc defining a cleaning zone separate from said inlet and outlet chambers, the disc and the clean-out means being relatively rotatable, sealing devices between the opposed clean-out means and the disc including a rubber facing member adjacent the inlet side of the disc having an aperture for discharge of material collected in said pockets and further having an imperforate area at each side of its aperture, each of which imperforate areas has radial and arcuate dimensions sufficient to bridge a section of the disc, and a second but imperforate rubber facing member adjacent the outlet side of the disc which has a radial dimension sufficient to bridge said sections and an arcuate dimension at least as great as the overall arcuate dimension of the first rubber facing member.

9. Straining equipment including a casing, a strainer disc mounted so as to divide the casing into inlet and outlet chambers, the disc being annularly divided into a plurality of strainer sections, straining means in each section spaced from the inlet side of the disc to provide a pocket, opposed clean-out means at each side of the disc defining a cleaning zone separate from said inlet and outlet chambers, the disc and the clean-out means being relatively rotatable, sealing devices between the opposed clean-out means and the disc including a rubber facing member adjacent the inlet side of the disc having an aperture for discharge of material collected in said pockets and further having an imperforate area at each side of its aperture, each of which imperforate areas has radial and arcuate dimensions sufficient to bridge a section of the disc, a second but imperforate rubber facing member adjacent the outlet side of the disc which has a radial dimension sufficient to bridge said sections and an arcuate dimension at least as great as the overall arcuate dimension of the first rubber facing member, and a backing plate for the second rubber member having a concavity formed therein whereby to permit outward distortion or displacement of the associated rubber member under the influence or pressure of fluid in the strainer sections.

10. Straining equipment including a casing, a strainer disc mounted so as to divide the casing into inlet and outlet chambers, the disc being annularly divided into a plurality of strainer sections, straining means in each section spaced from the inlet side of the disc to provide a pocket, opposed clean-out means at each side of the disc defining a cleaning zone separate from said inlet and outlet chambers, the disc and the clean-out means being relatively rotatable, sealing devices between the opposed clean-out means and the disc including a rubber facing member adjacent the inlet side of the disc having an aperture for discharge of material collected in said pockets and further having an imperforate area at each side of its aperture, each of which imperforate areas has radial and arcuate dimensions sufficient to bridge a section of the disc, a second rubber facing member adjacent the outlet side of the disc having an aperture for inlet of a cleaning medium, the second rubber member also having an imperforate area at each side of its aperture, each of which imperforate areas has radial and arcuate dimensions sufficient to bridge a section of the disc, and means for delivering a cleaning medium to the inlet aperture therefor.

11. Straining equipment including a casing, a strainer disc mounted so as to divide the casing into inlet and outlet chambers, the disc being annularly divided into a plurality of strainer sections, straining means in each section spaced from the inlet side of the disc to provide a pocket, opposed clean-out boxes at each side of the disc defining a cleaning zone separate from said inlet and outlet chambers, each box having a face presented toward the disc having an aperture for passage of a cleaning medium and further having an imperforate area at each side of the aperture, each of which imperforate areas has radial and arcuate dimensions sufficient to bridge a section of the disc, the disc and the clean-out boxes being relatively rotatable, rubber sealing means between the opposed surfaces of the disc and said box faces, and means for delivering a cleaning medium to one box and discharging it from the other, said medium flowing through the strainer sections in a direction opposite to the flow of the fluid being strained.

12. A continuously operable fluid strainer comprising in combination a casing having an inlet and an outlet for the fluid to be strained, a strainer disc, an annular series of strainer pockets in the disc, said disc being mounted in the casing so that the fluid flows from the inlet to the outlet through said strainer pockets, a clean-out box defining a cleaning zone on the inlet side of said disc, means for establishing a flow of fluid through said pockets in a direction opposite to the straining flow, said box having a face presented toward the disc with an aperture therein for receiving the fluid which flows in said opposite direction and said face further having an imperforate area at each side of the aperture, each of which imperforate areas has radial and arcuate dimensions sufficient to bridge a pocket of the disc, the disc and the box being relatively rotatable, rubber sealing means between the opposed surfaces of the disc and said box face, and means for effecting the relative rotation of the disc and the box.

13. Straining equipment of the character described including a strainer rotor, a casing in which the rotor is mounted, the casing being split into a plurality of separable portions and having inlet and outlet chambers at opposite sides of the rotor, and a mechanism for passing a cleaning medium in reverse flow through a portion of the strainer rotor including a clean-out box removably secured to one portion of the casing and at least in large part housed within another portion of the casing, and a pipe for the cleaning medium communicating with said box and extended to a point exterior of the casing through the portion thereof to which the box is removably secured, whereby the clean-out box may be exposed by removal of the portion of the casing in which it is housed, without disconnecting its associated pipe connection.

DANIEL RAYMOND McNEAL.